(12) United States Patent
Blok et al.

(10) Patent No.: US 9,708,435 B2
(45) Date of Patent: Jul. 18, 2017

(54) COMPATIBILIZED TIRE TREAD COMPOSITIONS

(71) Applicant: ExxonMobil Chemical Patents Inc.

(72) Inventors: Edward J. Blok, Huffman, TX (US);
Andy H. Tsou, Houston, TX (US);
Shuji Luo, Basking Ridge, NJ (US);
Elizabeth L. Walker, Stockertown, PA (US); Jingwen Zhang, Houston, TX (US); Yong Yang, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/902,927

(22) PCT Filed: Jul. 15, 2014

(86) PCT No.: PCT/US2014/046684
§ 371 (c)(1),
(2) Date: Jan. 5, 2016

(87) PCT Pub. No.: WO2015/023382
PCT Pub. Date: Feb. 19, 2015

(65) Prior Publication Data
US 2016/0152758 A1 Jun. 2, 2016

Related U.S. Application Data

(60) Provisional application No. 61/866,702, filed on Aug. 16, 2013.

(51) Int. Cl.
*C08F 299/00* (2006.01)
*C08F 297/00* (2006.01)
(Continued)

(52) U.S. Cl.
CPC .......... *C08F 299/00* (2013.01); *B60C 1/0016* (2013.04); *C08F 297/00* (2013.01);
(Continued)

(58) Field of Classification Search
None
See application file for complete search history.

(56) References Cited

U.S. PATENT DOCUMENTS 5,206,301 A 4/1993 Hattori et al.
5,405,911 A * 4/1995 Handlin, Jr. ............ C08C 19/44
525/139

(Continued)

FOREIGN PATENT DOCUMENTS

EP 0959096 11/1999
KR 2010-0021887 2/2010
(Continued)

*Primary Examiner* — Richard A Huhn
(74) *Attorney, Agent, or Firm* — Priya G. Prasad

(57) ABSTRACT

A polyolefin-polybutadiene block-copolymer and a tire tread composition comprising the polyolefin-polybutadiene block-copolymer, the composition comprising, by weight of the composition, within the range from 15 to 60 wt % of a styrenic copolymer, processing oil, filler, a curative agent, and from 4 to 20 wt % of a polyolefin-polybutadiene block-copolymer, wherein the polyolefin-polybutadiene block-copolymer is a block copolymer having the general formula PO-XL-fPB; where "PO" is a polyolefin block having a weight average molecular weight within the range from 1000 to 150,000 g/mole, the "fPB" is a functionalized polar polybutadiene block having a weight average molecular weight within the range from 500 to 30,000 g/mole, and "XL" is a cross-linking moiety that covalently links the PO and fPB blocks; and wherein the maximum Energy Loss (Tangent Delta) of the immiscible polyolefin domain is a temperature within the range from −30° C. to 10° C.

16 Claims, 7 Drawing Sheets

(51) Int. Cl.
- *C08F 299/02* (2006.01)
- *C08L 53/00* (2006.01)
- *B60C 1/00* (2006.01)
- *C08L 9/06* (2006.01)
- *C08C 19/40* (2006.01)
- *C08G 81/02* (2006.01)
- *C08C 19/25* (2006.01)
- *C08C 19/28* (2006.01)

(52) U.S. Cl.
CPC .............. *C08F 299/02* (2013.01); *C08L 9/06* (2013.01); *C08L 53/00* (2013.01); *C08C 19/25* (2013.01); *C08C 19/28* (2013.01); *C08C 19/40* (2013.01); *C08G 81/021* (2013.01)

(56) References Cited

U.S. PATENT DOCUMENTS

| | | |
|---|---|---|
| 5,541,262 A * | 7/1996 | Brichta ................. C08F 255/02 525/208 |
| 6,602,954 B1 | 8/2003 | Lin |
| 2009/0318644 A1 | 12/2009 | Brant et al. |
| 2012/0245293 A1 | 9/2012 | Crowther et al. |
| 2012/0245300 A1 | 9/2012 | Crowther et al. |
| 2013/0030135 A1 | 1/2013 | Hagadorn et al. |
| 2014/0088213 A1 | 3/2014 | Kulkarni et al. |
| 2014/0088263 A1 | 3/2014 | Crowther et al. |

FOREIGN PATENT DOCUMENTS

| | | |
|---|---|---|
| WO | 2004/024800 | 3/2004 |
| WO | 2013/041151 | 3/2013 |

\* cited by examiner

COMPATIBILIZED TIRE TREAD COMPOSITIONS

CROSS-REFERENCE TO RELATED APPLICATION

The present application claims priority to PCT Application No. PCT/US2014/046684 filed Jul. 15, 2014 and U.S. Ser. No. 61/866,702 filed Aug. 16, 2013, which are herein incorporated by reference.

FIELD OF THE INVENTION

The present invention relates to functionalized polyolefin-polybutadiene block-copolymer useful as a compatibilizer in tire treads.

BACKGROUND

The tire tread compound is the most important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound Tg would provide good wet traction but, at the same time, increase the rolling resistance and tread wear. There are needs to develop a tread compound additive that can provide wet traction without lowering the rolling resistance and tread wear.

The common industrial practices in using tread compound additives to tailor the wet traction and rolling resistance independently is to apply one additive to improve the silica dispersion and rolling resistance without affecting the wet traction while using another additive to raise wet traction without modifying the rolling resistance. The functionalized SBR (styrene butadiene rubber) is one additive used to enhance silica filler dispersion in tread compounds and to reduce rolling resistance without affecting wet traction. Nanoprene™, sub-micron to micron sized gels from Lanxess with cross-linked butadiene cores and acrylic shells, is the other additive used to raise the wet traction without affecting rolling resistance. However, Nanoprene can only deliver limited improvement in wet traction. Additionally, the presence of gels inside the tread compounding by using Nanoprene could fundamentally degrade the mechanical performance of a tread compound, especially in fatigue and cut resistance. This invention provides a nano-micelle solution to the tread compounds with improved wet traction without affecting rolling resistance. With the fine dimensions of these micelles, fatigue and cut resistance of the tread compound is expected to be preserved.

Related references include U.S. 2012-0245293; U.S. 2012-0245300; U.S. Ser. No. 61/704,611 filed on Sep. 24, 2012; and U.S. Ser. No. 61/704,725 filed on Sep. 24, 2012.

SUMMARY

Described herein is a polyolefin-polybutadiene block-copolymer and a tire tread composition comprising a polyolefin-polybutadiene block-copolymer, the composition comprising, by weight of the composition, within the range from 15 to 60 wt % of a styrenic copolymer, processing oil, filler, a curative agent, and from 4 to 20 wt % of the polyolefin-polybutadiene block-copolymer, wherein the polyolefin-polybutadiene block-copolymer is a block copolymer having the general formula PO-XL-fPB; where "PO" is a polyolefin block having a weight average molecular weight within the range from 1000 to 150,000 g/mole, the "fPB" is a functionalized polar polybutadiene block having a weight average molecular weight within the range from 500 to 30,000 g/mole, and "XL" is a cross-linking moiety that covalently links the PO and fPB blocks; and wherein the maximum Energy Loss (Tangent Delta) of the immiscible polyolefin domain is a temperature within the range from −30° C. to 10° C.

DETAILED DESCRIPTION

Figure 1:
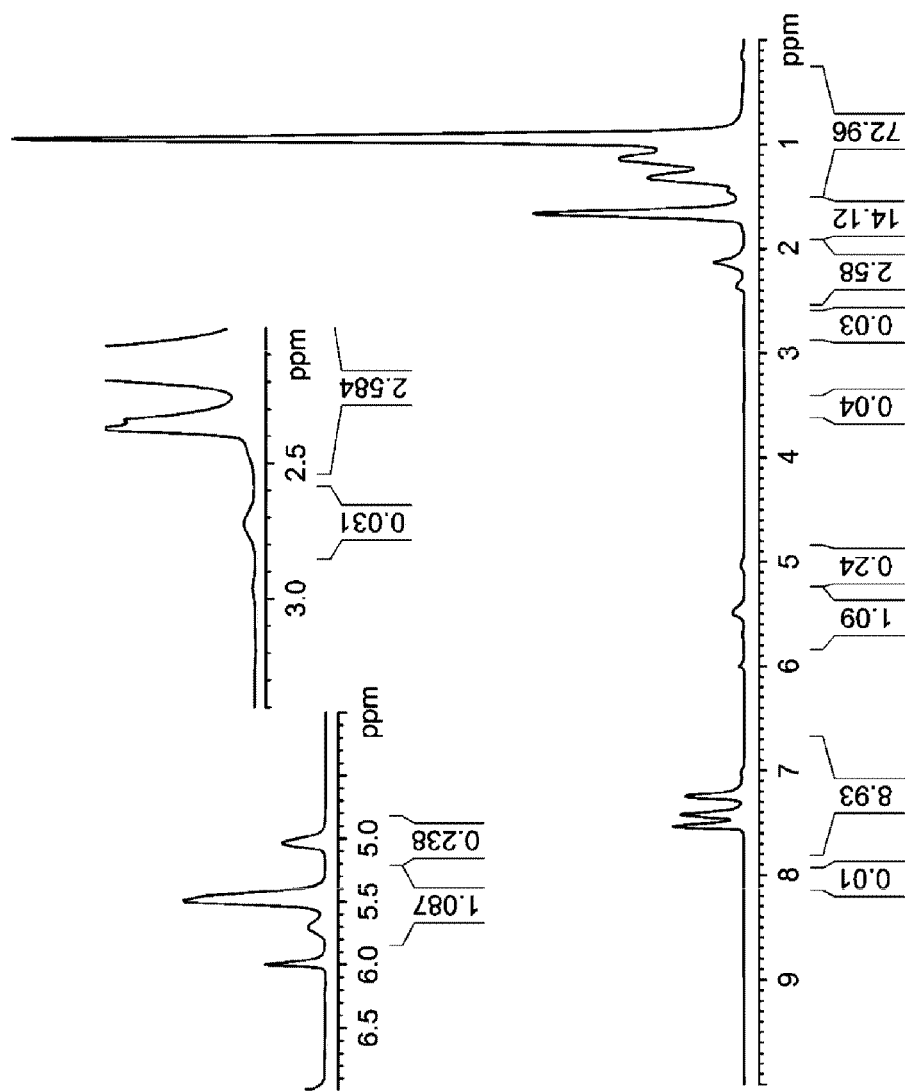
FIG. 1 is an $^1$H NMR of aPP-XL-PB-amine in $CDCl_2CDCl_2$ at 120° C.

This invention is directed to the synthesis of block copolymers containing amorphous polyolefin blocks and polybutadiene containing blocks with chain end functional groups and their use in tire tread compositions. The block copolymers are the reaction product of certain vinyl terminated macromers ("VTM"), for instance, amorphous polypropylene having terminal vinyl groups, and functionalized polar polybutadiene. The amorphous polyolefin block is preferred to have glass transition temperatures (Tg) from −50° C. to 10° C., more preferably from −45° C. to 5° C., and most preferably from −40° C. to 0° C. The weight average molecular weight of the amorphous polyolefin block is preferred from 1,000 to 150,000 g/mole, more preferably from 2,500 to 125,000 g/mole, and most preferably from 5,000 to 100,000 g/mole. The polyolefin block is derived directly from the VTM, described further below, and is preferably a homopolymer or copolymer of linear α-olefins from $C_2$ to $C_{12}$. The polybutadiene block is preferred to be a polybutadiene homopolymer or copolymer with acrylonitrile, styrene, acrylates, methacrylates, and isoprene wherein the butadiene content in the copolymer block is greater than 50 wt %, more preferably, greater than 55 wt %, and most preferably greater than 60 wt %. The polybutadiene block is preferred to have a molecular weight from 500 to 30,000 g/mole, more preferably from 1,000 to 25,000 g/mole, and most preferably from 2,000 to 20,000 g/mole. The chain end functional groups of the functional polybutadiene, or "fPB", are preferred to be amine, hydroxyl, sulfate, halogen, nitrile, and others that can interact strongly with the silanol groups on the silica surfaces for the silica dispersion enhancement. These asymmetric block copolymers with diene rubber immiscible polyolefin blocks would form micelles with polyolefin core and polybutadiene corona in butadiene-based diene rubber compounds, such as tire tread compounds. The micelle sizes are preferred to be less than 20 microns, more preferably less than 10 microns, and most preferably less than 5 microns, so not to have detrimental effects on mechanical performance of the said butadiene rubber compound. The polyolefin block would raise the loss tangent value of the butadiene rubber compound at temperature below 0° C. for better wet traction.

Vinyl-Terminated Macromer (VTM)

The vinyl-terminated macromers useful in the inventive polyolefin-polybutadiene block-copolymer described herein can be made in any number of ways. Preferably, the VTM's useful herein are polymers as first described in U.S. 2009/0318644 having at least one terminus ($CH_2CH=CH_2$-oligomer or polymer) represented by formula (I):

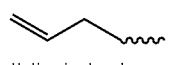

allylic vinyl end group (I)

where the "〜〜〜" represents the "PO" portion of the inventive block copolymers. In a preferred embodiment the allyl chain ends are represented by the formula (II):

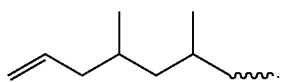

(II)

The amount of allyl chain ends is determined using $^1$H NMR at 120° C. using deuterated tetrachloroethane as the solvent on a 500 MHz machine, and in selected cases confirmed by $^{13}$C NMR. These groups (I) and (II) will react to form a chemical bond with a metal as mentioned above to form the $M-CH_2CH_2$-polymer. In any case, Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114 J. AM. CHEM. SOC. 1025-1032 (1992) that are useful herein.

The vinyl-terminated propylene-based polymers may also contain an isobutyl chain end. "Isobutyl chain end" is defined to be an oligomer having at least one terminus represented by the formula (III):

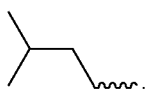

(III)

In a preferred embodiment, the isobutyl chain end is represented by one of the following formulae:

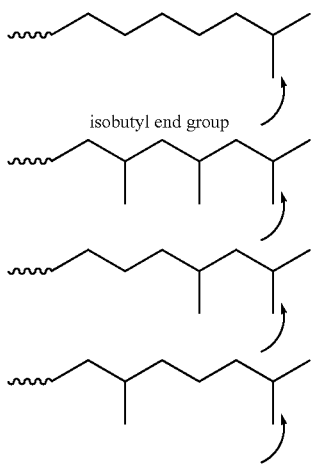

isobutyl end group

The percentage of isobutyl end groups is determined using $^{13}$C NMR (as described in the example section) and the chemical shift assignments in Resconi for 100% propylene oligomers. Preferably, the vinyl-terminated polymers described herein have an allylic terminus, and at the opposite end of the polymer an isobutyl terminus.

The vinyl-terminated macromer can be any homopolymer or copolymer of linear α-olefins from $C_2$ to $C_{12}$ having a vinyl-terminal group, and is preferably selected from the group consisting of vinyl-terminated isotactic polypropylenes, atactic polypropylenes, syndiotactic polypropylenes, and propylene-ethylene copolymers (random, elastomeric, impact and/or block), and combinations thereof, each having a Mn of at least 300 g/mole. Preferably, greater than 90 or 94 or 96% of the vinyl-terminated polyolefin comprises terminal vinyl groups; or within the range of from 10 or 20 or 30% to 50 or 60 or 80 or 90 or 95 or 98 or 100%. As described above, the vinyl-terminated macromers have a Mn value of at least 300 or 400 or 1000 or 5000 or 20,000 g/mole, or within the range of from 300 or 400 or 500 g/mole to 20,000 or 30,000 or 40,000 or 50,000 or 100,000 or 200,000 or 300,000 g/mole. Preferably, the VTM useful herein is amorphous polypropylene, and desirably has a glass transition temperature (Tg) of less than 10 or 5 or 0° C., more preferably less than −10° C.; or within the range of from 0 or −5 or −10° C. to −30 or −40 or −50° C. or as described herein. The VTMs are preferably linear, meaning that there is no polymeric or oligomeric branching from the polymer backbone, or alternatively, having a branching index "g" (or g'$_{(vis\ avg)}$), as is known in the art, of at least 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in U.S. Ser. No. 13/623,242, filed Sep. 20, 2012. The VTM portion of the inventive polyolefin-polybutadiene block-copolymer (being the "polyolefin" portion of the block copolymer) is the diene and/or styrenic rubber soluble portion.

Functionalized Polar Polybutadiene (fPB)

The functionalized polar polybutadiene (fPB) portion of the inventive polyolefin-polybutadiene block-copolymer (being the "polybutadiene" portion) is a polymer having polar functional groups pendant to the polymer backbone that allows the polymer (or the block portion of the invention block copolymer) to be miscible with silanol groups (or other polar or charged groups) of the filler that is part of the tire tread matrix in which it resides, as well as having a "functional" on at least one terminal end of the polymer to allow it to cross-link or otherwise form a chemical bond with the VTM, with or without a cross-linker compound described further below. The fPB preferably has a weight average molecular weight within the range of from 500 or 800 or 1000 or 10,000 g/mole to 15,000 or 20,000 or 25,000 or 30,000 g/mole. The fPB preferably has a number average molecular weight (Mn) within the range from 200 or 400 or 600 or 1000 or 2000 g/mole to 3000 or 3500 or 4000 or 4500 or 5000 g/mole. Desirably, the amine-equivalent weight of amine-containing fPBs is within the range of from 500 or 600 or 700 g/mole to 2000 or 2500 or 3000 g/mole.

The fPB comprises a polybutadiene primary component and at least one "polar" group along the polymer backbone selected from primary, secondary or tertiary amines, acrylonitrile, hydroxide, styrene, isoprene, acrylate, methacrylate, and combinations thereof. Also as mentioned above, the fPB preferably also comprises at least one terminal functional group capable of forming a covalent bond with a terminal-vinyl group or an epoxy moiety; wherein the terminal functional group of the fPB is most preferably a hydroxyl or amine group. In certain cases, the fPB does not comprise polar function groups in the polymer backbone and only has functional groups in the terminal portions of the polymer. Suitable examples of an fPB include amine-terminated poly(butadiene-co-acrylonitrile), polybutadiene diol, and polybutadiene-amine.

The inventive polyolefin-polybutadiene block-copolymers can be described as the reaction product. The "reaction product" between the VTM, fPB and optional cross-linker compound can take place in any number of sequences:
(i) VTM+fPB→PO-fPB
(ii) VTM+fPB+XL→PO-XL-fPB
(iii) VTM+XL→PO-XL; PO-XL+fPB→PO-XL-fPB
(iv) fPB+XL→fPB-XL; fPB-XL+VTM→PO-XL-fPB
wherein the VTM, once having reacted with either the fPB and/or XL, is a polyolefin block or "PO", having the same properties (MW, Tg) as described for the VTM above. These syntheses can be carried out sequentially in "one pot" or the reactant of each step can be purified before moving to the next step. Note that the fPB is such that the VTM preferably does not react with, or otherwise form a bond with, the polar groups along the fPB polymer backbone, but only the terminal functional groups of the fPB, thus, desirably forming a "block" copolymer as opposed to a "comb" type of polymer.

The cross-linker compound ("XL") is simply a low molecular weight, preferably 50 or 100 g/mole to 200 or 400 g/mole, bi-functional compound capable of forming covalent bonds with both the functionally-terminated fPB and the VTM, or, alternatively, a compound capable of forming a reactive terminal group with either the VTM or fPB block such that the reactive-terminal group bound thereto can then react with the other polymer block. Suitable examples of the former are compounds such as 1,1,3,3-tetramethyldisiloxane and (3-glycidoxypropyl)-1,1,3,3-tetramethyldisiloxane (reacted with the suitable metal catalyst). Suitable examples of the latter are compounds such as chloroperbenzoic acid, which preferably forms an epoxy group on one block which can then react and form a bond to the other block.

Thus, the XL can react individually with the VTM, fPB, or both at the same time. The reactant XL-PO preferably has the general formula:

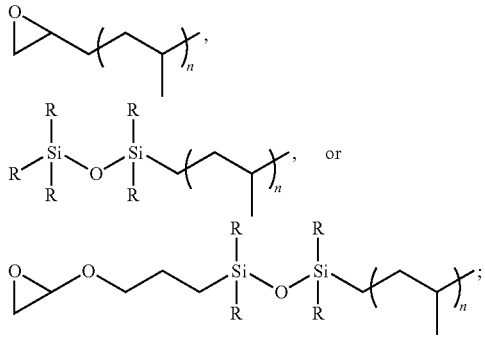

wherein each "R" group is independently selected from $C_1$ to $C_{10}$ alkyls, and wherein the value of "n" is preferably within the range of from 50 to 1000.

Thus formed, the inventive polyolefin-polybutadiene block-copolymer is highly suitable as a compatibilizer in tire formulations, especially tire tread formulations where there is a desire to compatibilize the diene and/or styrenic portion of the tire formulation and the more polar filler portions. Thus, the invention includes a polyolefin-polybutadiene block-copolymer that is the reaction product of a functionalized polar polybutadiene (fPB), a vinyl-terminated macromer (VTM), and optional cross-linker compound (XL), where the vinyl-terminated macromer forms a polyolefin block having a weight average molecular weight within the range from 1000 to 150,000 g/mole, the functionalized polar polybutadiene (fPB) has a weight average molecular weight within the range from 500 to 30,000 g/mole, and the optional cross-linker compound (XL) comprises at two cross-linking moieties that reacts with the vinyl group of the VTM to form a cross-linking moiety covalently linked (XL-PO) or (fPB-XL) thereto; and wherein the VTM comprising the cross-linking moiety (XL-PO) reacts with the fPB to form the polyolefin-polybutadiene block-copolymer, or the fPB comprising the cross-linking moiety (fPB-XL) reacts with the VTM to form the polyolefin-polybutadiene block-copolymer.

The inventive block copolymer has certain desirable features. For example, the weight average molecular weight of the polyolefin-polybutadiene block-copolymer is preferably from 1,000 to 150,000 g/mole, more preferably from 2,500 to 125,000 g/mole, and most preferably from 5,000 to 100,000 g/mole. Described another way, the polyolefin-polybutadiene block-copolymer can be described as having the general formula:

PO-XL-fPB;

where "PO" is a polyolefin block having a weight average molecular weight within the range from 1000 to 150,000 g/mole, the "fPB" is a functionalized polar polybutadiene block having a weight average molecular weight within the range from 500 to 30,000 g/mole, and "XL" is a cross-linking moiety that covalently links the PO and fPB blocks. Desirably, the XL is preferably directly derived from an epoxide, an organosilane, an organosiloxane, or an epoxysiloxane. Desirably, the fPB block comprises a polybutadiene primary component and at least one functional group selected from primary, secondary or tertiary amines, acrylonitrile, hydroxide, styrene, isoprene, acrylate, methacrylate, and combinations thereof.

The inventive block copolymer is most useful as a compatibilizer in tire tread formulations. The inventive tire tread formulation may comprise (by weight of the formulation or composition) within the range of from 15 to 50 or 60 wt % of a styrenic copolymer; from 0 or 5 to 20 or 40 wt % of processing oil; from 20 to 60 wt % of filler, most preferably a silica-based filler; a curative agent, many useful ones for which are well known in the art; and within the range of from 4 or 6 or 8 wt % to 16 or 18 or 20 wt % of a polyolefin-polybutadiene block-copolymer, wherein the polyolefin-polybutadiene block-copolymer is a block copolymer having the general formula PO-XL-fPB as described above. Most preferably, the tire tread formulation is characterized wherein the maximum Energy Loss (Tangent Delta) of the immiscible polyolefin domain is a temperature within the range from −30 or −25 or −20 or −10° C. to −5 or 0 or 10° C.

The inventive tire tread formulations may further comprise within the range from 5 or 10 wt % to 15 or 20 or 25 wt %, by weight of the formulation of a propylene-α-olefin elastomer. Such elastomers are described in, for example, U.S. Pat. No. 8,013,093, and is sold under such names as Vistamaxx™, Tafmer™, and Versify™. Generally, these are random polypropylene copolymers having from 5 to 25 wt % ethylene or butene-derived comonomer units having limited isotactic sequences to allow for some level of crystallinity, the copolymers typically having a weight average molecular weight within the range of from 10,000 or 20,000 g/mole to 100,000 or 200,000 or 400,000 g/mole and a melting point (DSC) of less than 110 or 100° C.

Although any styrenic copolymer is useful, those most desirable in the tire formulations are styrene-butadiene block copolymer "rubbers." Such rubbers preferably have from 10 or 15 or 20 wt % to 30 or 25 or 40 wt % styrene derived units, by weight of the block copolymer, and within the range of from 30 or 40 or 45 wt % to 55 or 60 or 65 wt % vinyl groups.

By "silica-based" filler, what is meant is solid, usually granular, type of composition comprising silicon oxide or silicon oxide units within its solid matrix. Examples include Zeosil™ silicas from Rhodia. Desirably, the silica-based filler has an average particle size within the range of from 10 or 15 nm to 30 or 40 nm as determined by SAXS (Small Angle X-ray Scattering analysis), and an average aggregate size within the range from 30 or 40 nm to 80 or 100 or 110 nm as determined by XDC (X-ray centrifugation).

Useful tire tread compositions can also comprise 15 to 50 or 60 wt % of a styrenic copolymer; 0 or 5 wt % to 60 wt % of a polybutadiene polymer; 0 to 60 wt % of natural rubber or synthetic polyisoprene; 15 to 50 or 60 wt % of a functionalized styrenic copolymer; 0 or 5 wt % to 60 wt % of a functionalized polar polybutadiene polymer; 0 or 5 wt % to 60 wt % of natural rubber or functionalized synthetic polyisoprene; 0 or 5 wt % to 20 or 40 wt % of processing oil; 20 wt % to 60 wt % of filler, especially silica-based filler as described herein; a curative agent; and 4 wt % to 20 wt % of a polyolefin-polybutadiene block-copolymer, and 0 or 5 wt % to 40 wt % of a hydrocarbon resin, the weight percentages based on the total composition.

The tire tread formulation has many desirable properties when the inventive block copolymer is present in the formulations. For instance, the Modulus at 300% of the cured composition is preferably within the range from 1000 or 1100 or 1200 or 1300 or 1400 psi to 1800 or 1900 or 2000 or 2100 or 2200 psi. Also, the Ultimate Tensile Strength of the cured composition is preferably within the range of from 1600 or 1800 psi to 2400 or 2600 or 2800 or 3000 psi. The Ultimate elongation of the cured composition is preferably within the range of from 320 or 340% to 420 or 440 or 460 or 480 or 500%. The Tangent Delta (0° C.) of the cured composition is preferably greater than 0.330 or 0.335 or 0.340 or 0.350; or within a range from 0.320 or 0.340 to 0.360 or 0.380 or 0.400. The Tangent Delta (60° C.) of the cured composition is preferably greater than 0.172 or 0.174 or 0.176 or 0.180; or within a range of from 0.170 or 0.174 or 0.176 to 0.180 or 0.186 or 0.190 or 0.200. Also, the maximum Energy Loss (Tangent Delta, wherein the slope is zero) of the immiscible polyolefin domain of the cured composition is preferably a temperature within the range from −30 or −25 or −20 or −10° C. to −5 or 0 or 10° C. Finally, micelles comprising the compatibilizer in the polymer matrix of the other components have sizes that are preferred to be less than 20 microns, more preferably less than 10 microns, and most preferably less than 5 microns; or within a range of from 0.1 or 0.2 or 0.5 or 1.0 microns to 5 or 10 or 20 microns.

The various descriptive elements and numerical ranges disclosed herein for the polyolefin-polybutadiene block-copolymer, the reactants used to make the inventive polyolefin-polybutadiene block-copolymer, and its use in tire tread formulations can be combined with other descriptive elements and numerical ranges to describe the invention(s); further, for a given element, any upper numerical limit can be combined with any lower numerical limit described herein. The features of the invention are described in the following non-limiting examples.

Examples

Synthesis of aPP-XL-Polybutadiene-Amine (aPP-XL-PB-Amine)

A round-bottomed flask was charged with vinyl-terminated atactic polypropylene (aPP, Mn=54000, Tg=−20° C., 5 grams, 0.0926 millimole) and xylene (50 milliliters). The mixture was heated under nitrogen to 120° C. with stirring to fully dissolve the polypropylene, then the heat was reduced to 90° C. A solution of m-chloroperbenzoic acid (0.457 gram, 1.85 millimoles) in xylene (10 milliliters) was then added dropwise to the flask. After the addition was complete, the reaction mixture was maintained at 90° C. for 24 hours. This warm reaction mixture was then added slowly into a large quantity of methanol with stirring for precipitating and recovering the product. The product was dried in a vacuum overnight.

The above product was mixed with Emerald 2000X173ATB (polybutadiene-amine, 0.35 gram, amine equivalent weight 950), magnesium dibromide etherate (0.005 gram, 0.0184 millimole) and 1,2,4-trichlorobenzene (50 milliliters). The mixture was heated under nitrogen to 120° C. overnight. The final product, aPP-XL-PB-amine, was precipitated out of methanol and dried in vacuum overnight. NMR of the final product was taken as described and shown in FIG. 1.

Scheme 1: Reaction between vinyl terminated aPP and polybutadiene amine.

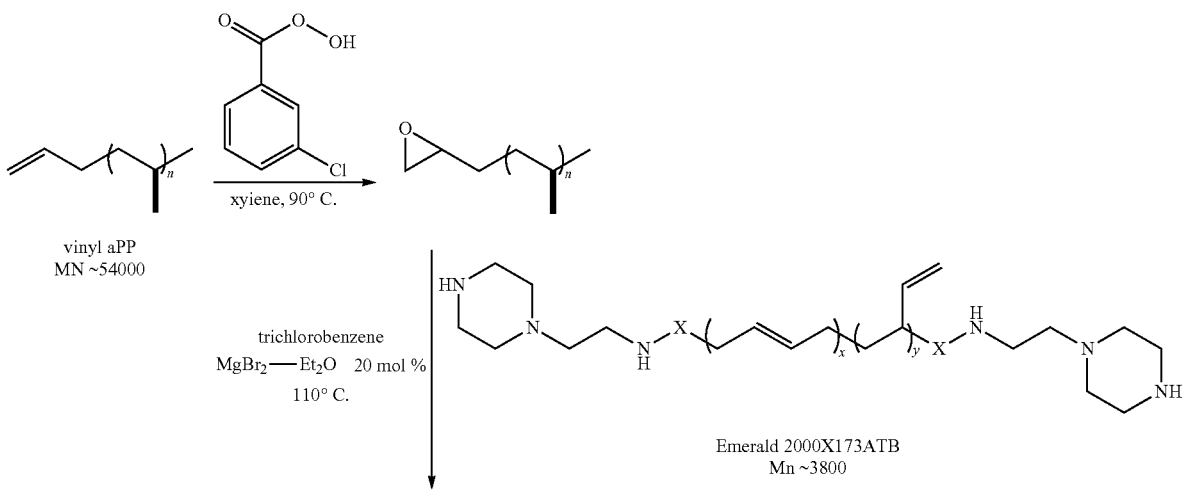

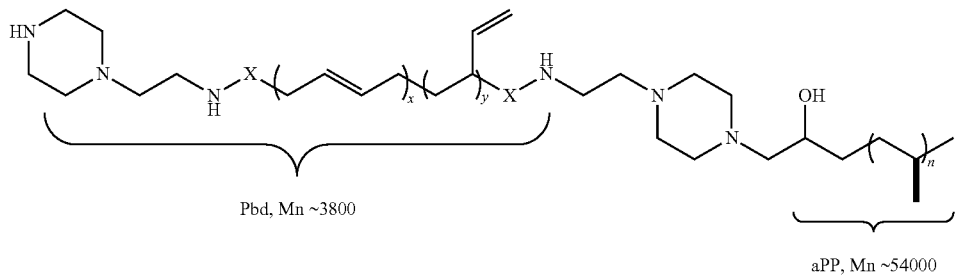

Pbd, Mn ~3800  aPP, Mn ~54000

Synthesis of aPP-XL-Polybutadiene-Ol (aPP-XL-PB-OH)

A round-bottomed flask was charged with vinyl-terminated atactic polypropylene (aPP, Mn 11,966, 1.5 grams, 0.125 millimole) and toluene (50 milliliters). The mixture was heated under nitrogen to 50° C. with stirring. 1,1,3,3-tetramethyldisiloxane (0.5 grams, 3.72 millimoles) was then added to the flask, followed by a platinum(0)-1,3-divinyl-1,1,3,3-tetramethyldisiloxane complex solution (approximately 2 wt % Pt, 0.05 grams, 0.005 millimole). After the addition was complete, the reaction mixture was maintained at 50° C. for 2 hours. Solvent and unreacted 1,1,3,3-tetramethyldisiloxane were removed under vacuum.

Figure 2:
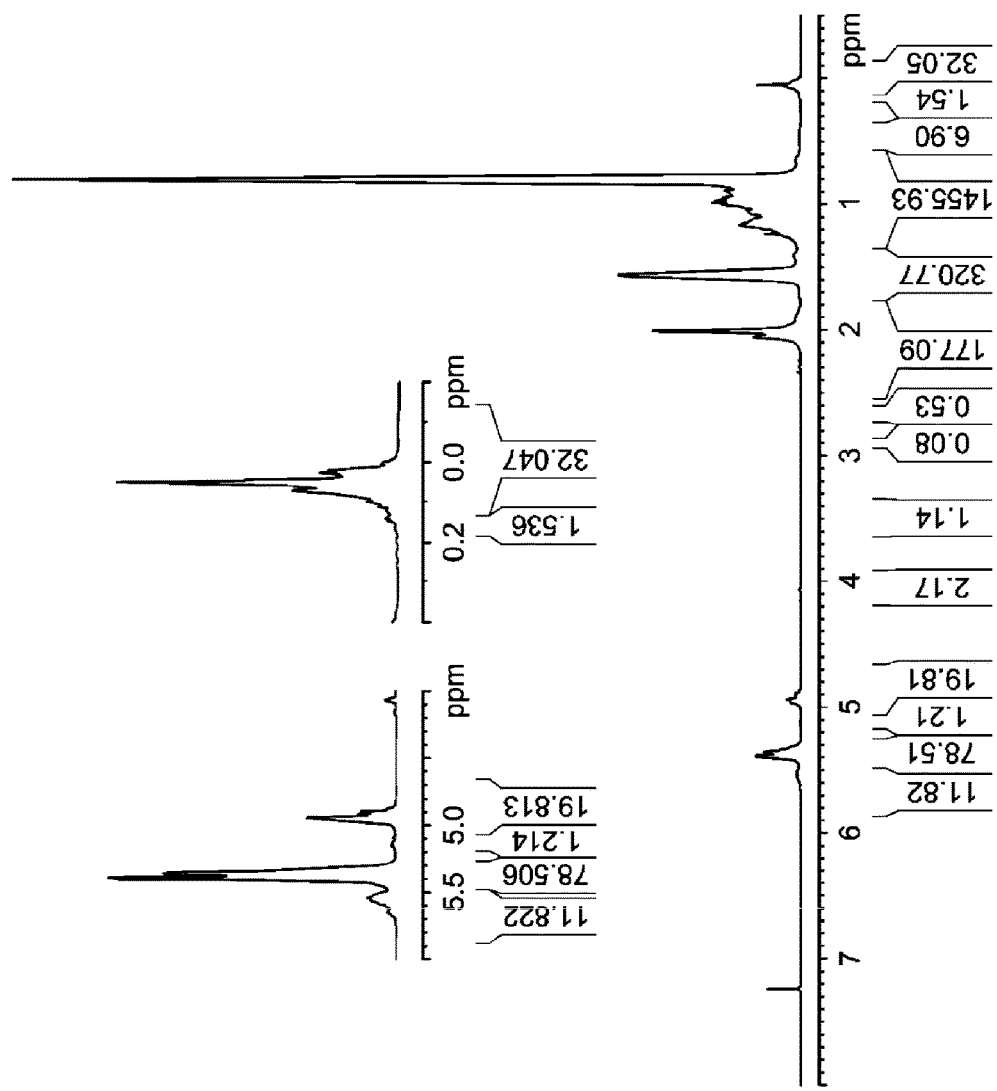
FIG. 2 is an $^1$H NMR of aPP-XL-PB-OH in $CDCl_3$ at 25° C.

The above product was mixed with polybutadiene diol (0.45 grams, HO equivalent weight 1191) and toluene (50 milliliters). The mixture was heated under nitrogen to 80° C., then platinum(0)-1,3-divinyl-1,1,3,3-tetramethyldisiloxane complex solution (approximately 2 wt % Pt, 0.05 grams, 0.005 millimole) was added to the solution. The reaction mixture was maintained at 80° C. for 2 hours. The warm reaction mixture was added slowly to large quantities of methanol with stirring to precipitate the product out. The final product, aPP-XL-PB-OH was dried in vacuum overnight. An NMR was taken of this product and shown in FIG. 2.

Scheme 2: Reaction between vinyl terminated aPP and polybutadiene diol.

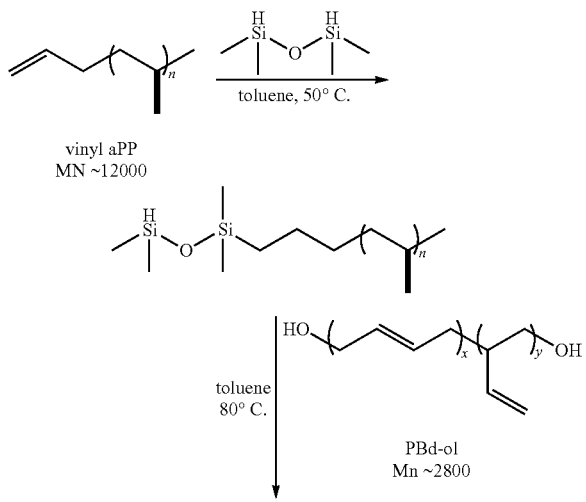

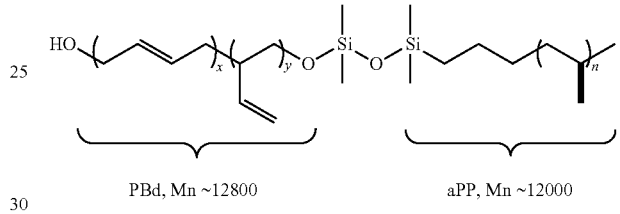

PBd, Mn ~12800   aPP, Mn ~12000

Synthesis of aPP-XL-Poly(Butadiene-Co-Acrylonitrile)-Amine (aPP-XL-NBR-Amine)

A round-bottomed flask was charged with vinyl-terminated atactic polypropylene (aPP, Mn 11966, 3 grams. 0.251 millimole), (3-glycidoxylpropyl)-1,1,3,3-tetramethyldisiloxane (0.6 grams. 2.42 millimoles) and toluene (50 milliliters). The mixture was heated under nitrogen to 80° C. with stirring, then platinum(0)-1,3-divinyl-1,1,3,3-tetramethyldisiloxane complex solution (approximately 2 wt % Pt, 0.05 gram, 0.005 millimole) was added. The reaction mixture was maintained at 80° C. for 2 hours. The warm mixture was then slowly added to cold methanol (300 milliliters) to precipitate the product out.

The above product (1.2 grams) was mixed with Emerald 1300X45ATBN (poly(butadiene-co-acrylonitrile)-amine, 1.4 grams, amine equivalent weight 1850), magnesium dibromide etherate (0.005 grams. 0.0184 millimole) and chlorobenzene (50 milliliters). The mixture was heated under nitrogen to 110° C. overnight. The solvent was removed under vacuum, and the final product, aPP-XL-NBR1-amine, was washed with methanol and dried under vacuum overnight.

Figure 3:
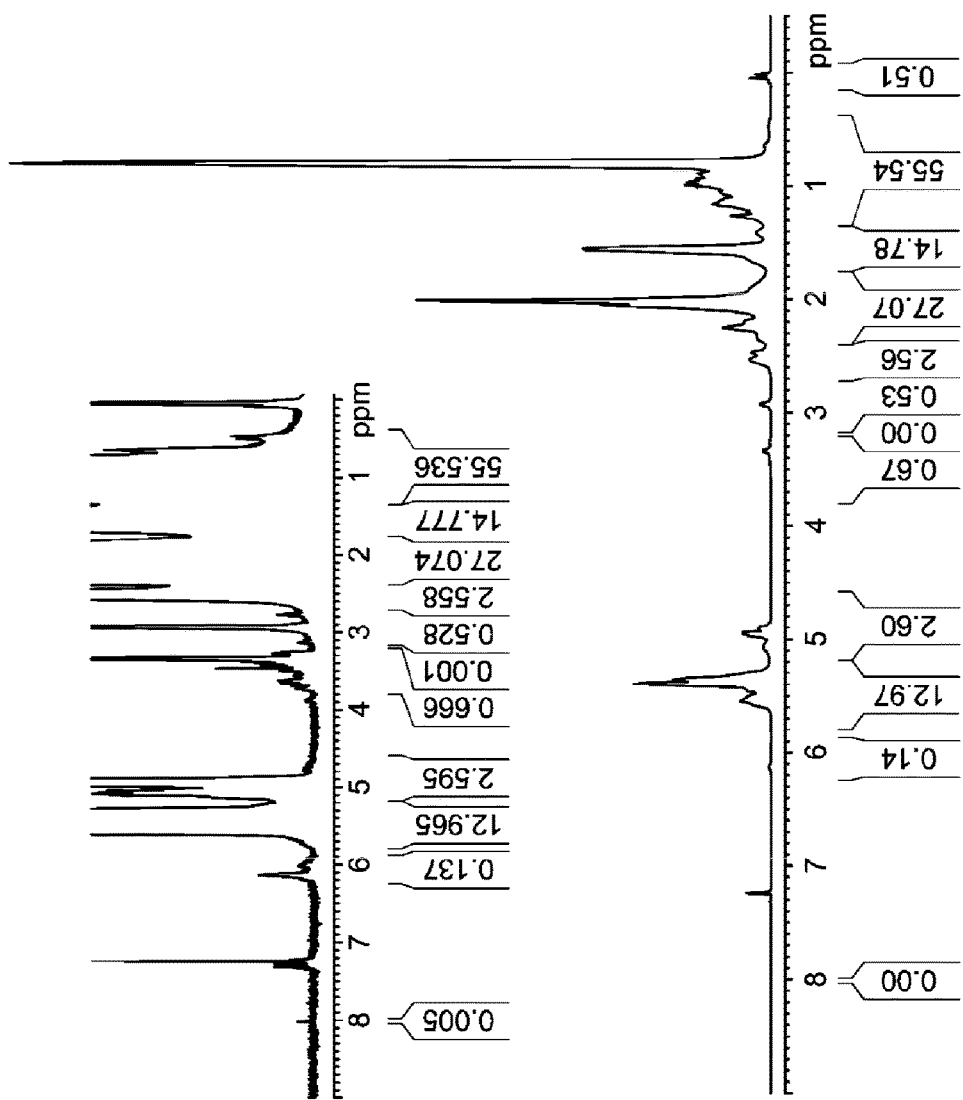
FIG. 3 is an $^1$H NMR of aPP-XL-NBR1-amine in $CDCl_3$ at 25° C.

The same above product (1.2 grams) was mixed with Emerald 1300X21ATBN (poly(butadiene-co-acrylonitrile)-amine, 1.0 grams, amine equivalent weight 1200), magnesium dibromide etherate (0.005 grams, 0.0184 millimole) and chlorobenzene (50 milliliters). The mixture was heated under nitrogen to 110° C. overnight. The solvent was removed under vacuum, and the final product, aPP-XL-NBR2-amine, was washed with methanol and dried under vacuum overnight. An NMR was taken of this product and shown in FIG. 3.

Scheme 3: Reaction between vinyl terminated aPP and poly(butadiene-co-acrylonitrile)-amine.

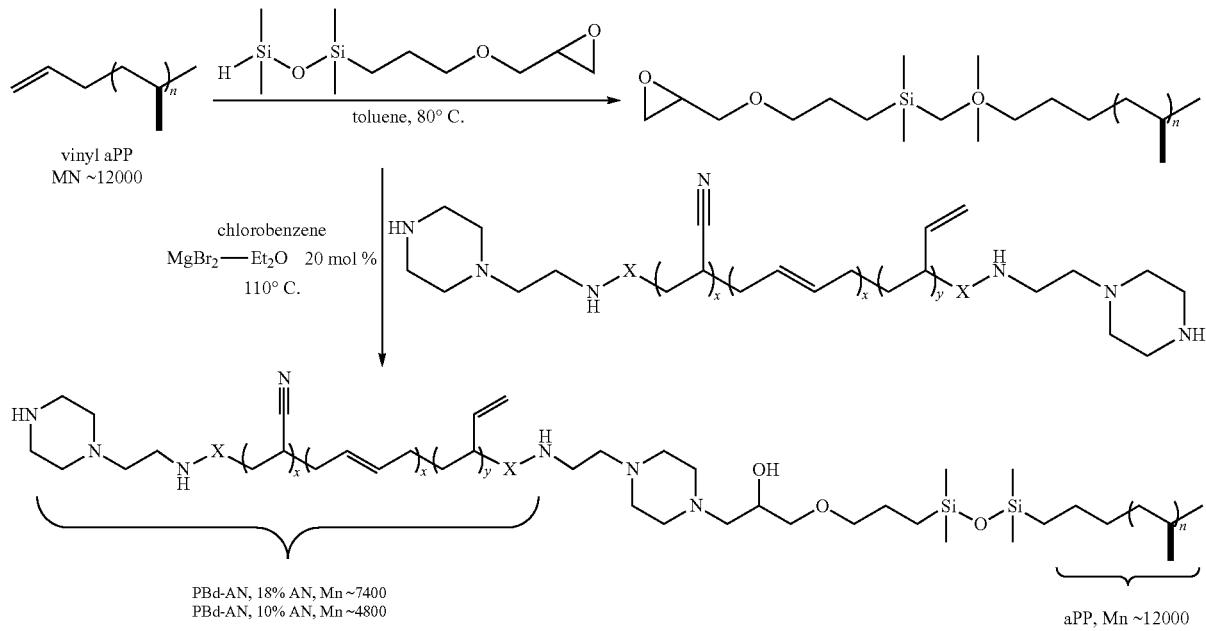

PBd-AN, 18% AN, Mn ~7400
PBd-AN, 10% AN, Mn ~4800 aPP, Mn ~12000

Figure 4:
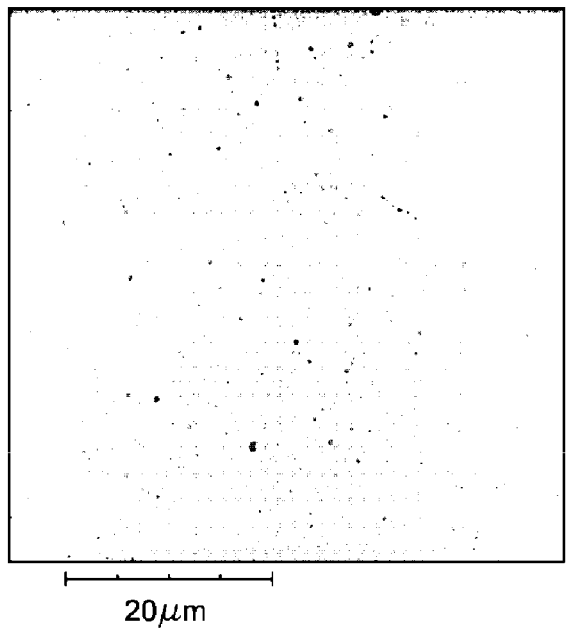
FIG. 4 is an SEM image of aPP-XL-PB-amine micelles in a BR/SBR blend.

Solution Blending of aPP-XL-PB-Amine (26375-36) with Butadiene and Styrene-Butadiene Rubbers A glass bottle was charged with aPP-XL-PB-amine (26375-36, 0.2 grams). Toluene was added and the mixture was vigorously stirred in a 70° C. oil bath until a homogeneous solution formed. Styrene-butadiene rubber (0.7 grams, VSL 5025 SBR, Lanxess) was then added followed by the addition of butadiene rubber (0.3 grams, Taktene™ 1203 BR, Lanxess). The resulting warm solution blend was stirred until a homogenous mixture can be found. Afterward, methanol was slowly poured into this solution blend to precipitate out the polymer. The precipitated polymer blend was dried under vacuum overnight. The polymer blend thus formed was cryo-faced using a cryo-microtome (Leica) at −120° C. for morphology examination by a desktop SEM (Phenom G2 SEM, Phenom). As shown in the representative SEM micrograph of this blend in FIG. 4, aPP-XL-Polybutadiene-amine micelles of 0.1 micron to 0.9 micron in the matrix of BR and SBR can be observed. An SEM of the composition is shown in FIG. 4.

Silica Tread Compounding

Tread compound formulations for three compounds, two references and one example, are listed in Table 1. All components are listed in phr, or part per hundred, of polymer unit. These compounds were mixed in two passes using a Banbury mixer which was warmed up to 120° C. for the first pass before any addition. The first pass mixed all components except curative at 25 RPM with polymers added at 0 minutes, half of the silica at 30 seconds, rest of the silica and all others except aPP-XL-PB-amine at 1 minute, aPP-XL-PB-amine at 6 minutes with RPM ramped up to 152, and compounds removed at 7 minutes and 30 seconds with 151-153° C. compound temperature. After compounds were cooled, the same Banbury mixer was used to blend in the curatives during the second pass at 35 RPM and 70° C. The compound from the first pass was added into the mixer at 0 minutes with curatives added at 30 seconds followed by mixing for an another 6 minutes and 30 seconds with a total mix time of 7 minutes.

TABLE 1

Tread compound formulations.

| Compound (phr) | Reference 1 | Example 1 | Reference 2 |
|---|---|---|---|
| VSL 5025 (SBR 25% styrene, 50% vinyl) | 60 | 60 | 60 |
| Silica (Z1165) | 70 | 70 | 70 |
| PBD (Taktene ™ 1203), high cis-PBD | 40 | 40 | 40 |
| X50S (Si-69/N330 50/50) | 11.2 | 11.2 | 11.2 |
| Nytex ™ 4700, (Naphthenic oil) | 15 | 15 | 15 |
| 6PPD,N-(1,3-Dimethylbutyl)-N'-phenyl-1,4-phenylenediamine | 2 | 2 | 2 |
| Inventive compatibilizer (aPP-XL-PB-amine) | — | 12 | — |
| Stearic acid | 2.5 | 2.5 | 2.5 |
| TOTAL PHR | 200.7 | 212.7 | 200.7 |
| Curative | | | |
| Zinc Oxide | 2.5 | 2.5 | 2.5 |
| Vulkacit ™ CBS-N-Cyclohexyl-2-benzothiazolesulfenamide | 1.7 | 1.7 | 1.7 |
| Sulfur | 1.4 | 1.4 | 1.4 |
| Perkacit ™ DPG-N,N'-Diphenylguanidine | 2 | 2 | 2 |

Loss Tangent Measurements

The compounds listed in Table 1 were compression molded and cured into pads. Afterward, a rectangular test specimen was cut off from the cured pads and mounted in an ARES (Advanced Rheometric Expansion System, TA instruments) for dynamic mechanical testing in torsion rectangular geometry. A strain sweep at room temperature (20° C.) up to 5.5% strains and at 10 Hz was conducted first to ensure the linear viscoelasticity followed by a temperature sweep at 4% strain and 10 Hz from −35° C. to 100° C. at 2° C./min ramp rates. Storage and loss moduli were measured along with the loss tangent values. For better wet traction, it is preferred to have higher loss tangent values at temperatures below 0° C. whereas the loss tangent is preferred to be lower at 40° C. for better rolling resistance. As listed in Table 2, the addition of aPP-XL-PB-amine raises the loss tangent values at temperatures below 0° C. without raising the loss tangent value at 40° C.

TABLE 2

Loss tangent values of reference and example tread compounds.

| Tan delta @ Temperature | Reference 1 | Reference 2 | Example 1 |
|---|---|---|---|
| −5.0 | 0.355 | 0.358 | 0.522 |
| −1.0 | 0.329 | 0.333 | 0.465 |
| 5.0 | 0.296 | 0.301 | 0.352 |
| 40.0 | 0.194 | 0.198 | 0.194 |

Solution Blending of aPP-XL-PB-OH (26375-45) with Vistamaxx

A glass bottle was charged with aPP-XL-PB-OH (26375-45, 1.0 grams, from "scheme 1" above) and Vistamaxx™ 6200 propylene elastomer (9.0 grams, ExxonMobil Chemical, Tg=−29° C., Mw=135,000, ethylene-derived content of 15 wt %). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight and used as the compound additive.

Figure 5:
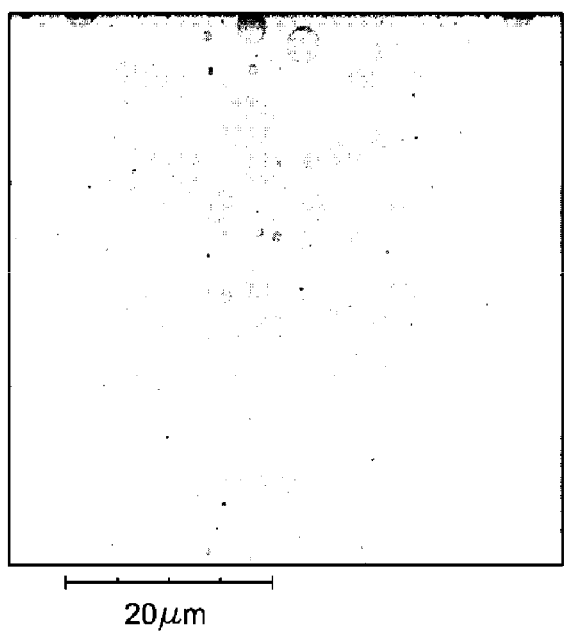
FIG. 5 is an SEM image of aPP-XL-PB-OH/Vistamaxx™ propylene elastomer domains in a BR/SBR blend.

A glass bottle was charged with aPP-XL-PB-OH (26375-45, 0.04 grams) and Vistamaxx 6200 (0.36 grams). Toluene was added and the mixture was vigorously stirred in a 70° C. oil bath until a homogeneous solution formed. Styrene-butadiene rubber (1.4 grams, VSL 5025 SBR. Lanxess) was then added followed by the addition of butadiene rubber (0.6 gram, Taktene 1203 BR, Lanxess). The resulting warm solution blend was stirred until a homogenous mixture formed. Afterward, methanol was slowly poured into this solution blend to precipitate out the polymers. The precipitated polymer blend was dried under vacuum overnight. The polymer blend thus formed was cryo-faced using a cryo-microtome (Leica) at −120° C. for morphology examination by a desktop SEM (Phenom™ G2 SEM, Phenom). As shown in the representative SEM micrograph of this blend in FIG. 5. Vistamaxx 6200 domains of 0.5 micron to 10 microns in the matrix of BR and SBR can be observed.

Synthesis of aPP-XL-Poly(Butadiene-Co-Acrylonitrile)-Amine (aPP-XL-NBR-Amine)

A round-bottomed flask was charged with vinyl-terminated atactic polypropylene (aPP, Mn 11,966, 2.0 grams, 0.167 millimole) and toluene (50 milliliters). The mixture was heated under nitrogen to 80° C. with stirring. A toluene solution of m-chloroperoxybenzoic acid (0.206 gram, 0.836 millimole) was then added dropwise to the flask. After the addition was complete, the reaction mixture was maintained at 80° C. overnight. Afterward, the reaction mixture was slowly poured into large quantities of methanol with vigorous stirring. The liquid phase was decanted. The solid was re-dissolved in 50 milliliters of hexanes and transferred to a separation funnel. 50 milliliters methanol was added and the mixture was shaken vigorously. The lower layer (methanol layer) was discharged. Two more times of 50 milliliters methanol were added and the mixture was shaken and separated. The hexane layer was then transferred to a flask and stripped under vacuum.

The above product was mixed with amine-terminated poly(butadiene-co-acrylonitrile) (Emerald 1300X45ATBN, 1.45 grams, amine equivalent weight 1850) and xylene (50 milliliters). The mixture was heated under nitrogen to 110° C. for 3 days. The product was precipitated by methanol and dried under vacuum.

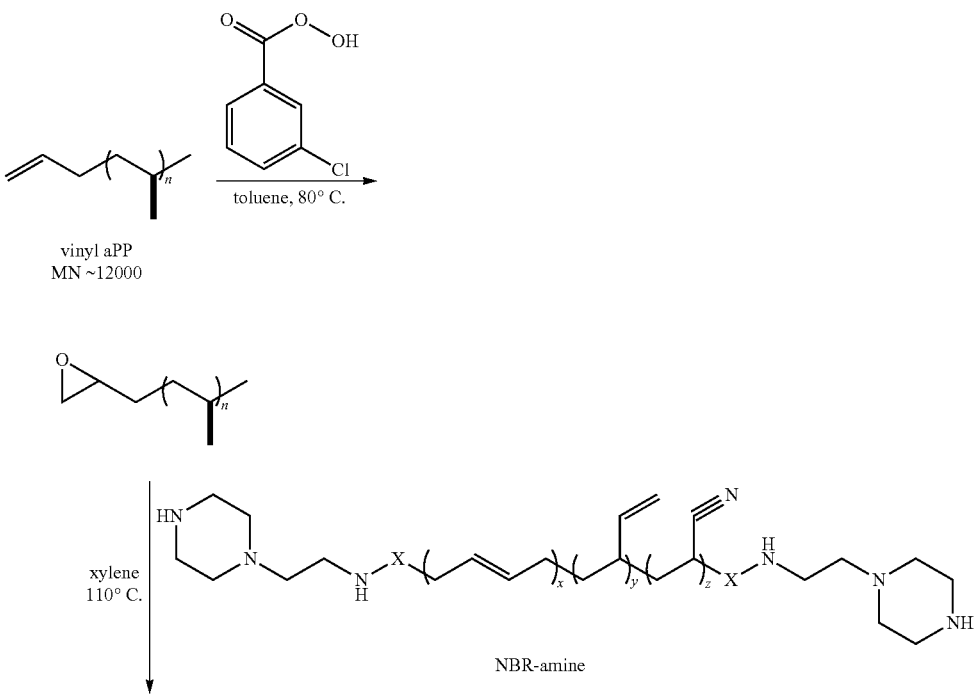

Scheme 4: Reaction between vinyl terminated aPP and poly(butadiene-co-acrylonitrile)-amine.

-continued

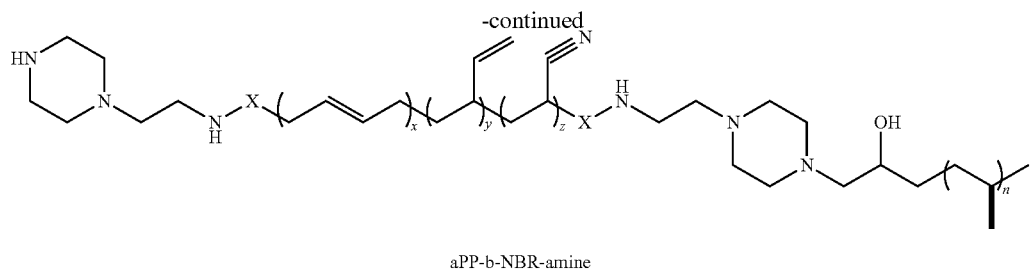

aPP-b-NBR-amine

Solution Blending of aPP-XL-NBR-Amine (25907-104) with Vistamaxx

A glass bottle was charged with aPP-XL-NBR-amine (25907-104, 1.0 grams) and Vistamaxx 6200 (9.0 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight, and used directly as the compound additive.

Figure 6:
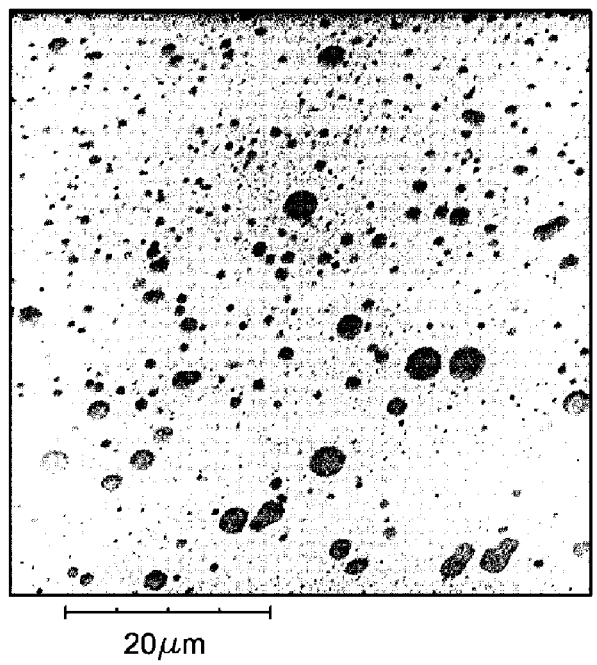
FIG. 6 is an SEM image of aPP-XL-NBR-amine/Vistamaxx domains in a BR/SBR blend.

A glass bottle was charged with aPP-XL-NBR-amine (25907-104, 0.04 grams) and Vistamaxx 6200 (0.36 grams). Toluene was added and the mixture was vigorously stirred in a 70° C. oil bath until a homogeneous solution formed. Styrene-butadiene rubber (1.4 grams, VSL 5025 SBR, Lanxess) was then added followed by the addition of butadiene rubber (0.6 grams, Taktene 1203 BR, Lanxess). The resulting warm solution blend was stirred until a homogenous mixture formed. Afterward, methanol was slowly poured into this solution blend to precipitate out the polymers. The precipitated polymer blend was dried under vacuum overnight. The polymer blend thus formed was cryo-faced using a cryo-microtome (Leica) at −120° C. for morphology examination by a desktop SEM (Phenom G2 SEM, Phenom). As shown in the representative SEM micrograph of this blend in FIG. 6. Vistamaxx 6200 domains of 0.3 microns to 5 microns in the matrix of BR and SBR can be observed.

Solution Blending of aPP-XL-NBR-Amine with Vistamaxx

A glass bottle was charged with aPP-XL-NBR-amine ("scheme 3" above, 1.0 grams) and Vistamaxx 6200 (9.0 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight, and used as the compound additive.

A glass bottle was charged with aPP-XL-NBR-amine (26375-58, 1.0 grams) and Vistamaxx 6200 (9.0 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight, and submitted for silica tread compounding and testing.

Figure 7A:
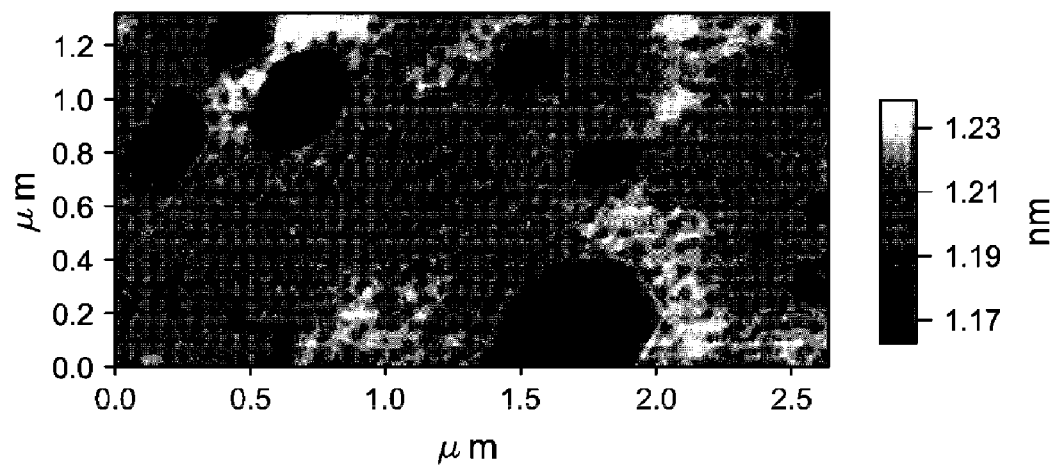
FIGS. 7A and 7B are AFM images of aPP-XL-NBR-amine/Vistamaxx domains in a BR/SBR blend.
Figure 7B:
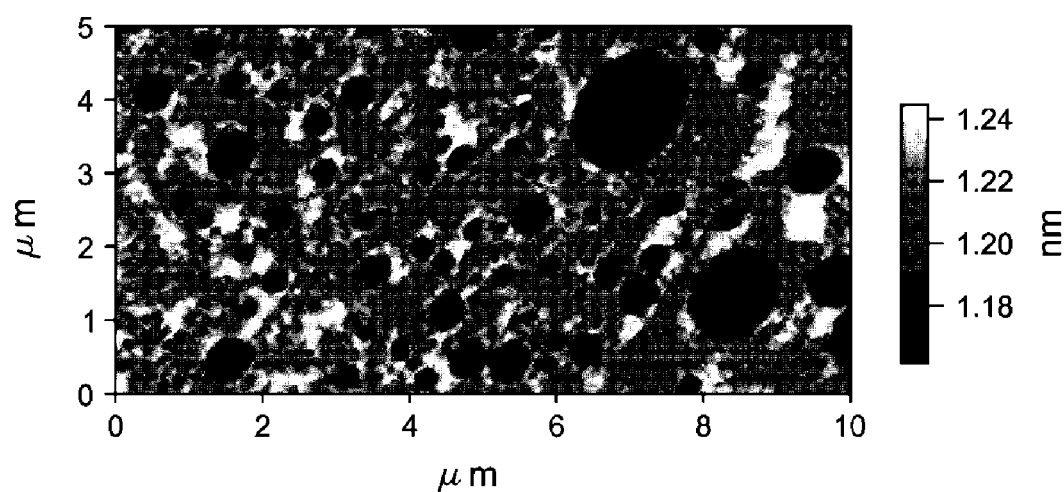

A glass bottle was charged with aPP-XL-NBR-amine (26375-57, 0.04 grams) and Vistamaxx 6200 (0.36 grams). Toluene was added and the mixture was vigorously stirred in a 70° C. oil bath until a homogeneous solution formed. Styrene-butadiene rubber (1.4 grams, VSL 5025 SBR, Lanxess) was then added followed by the addition of butadiene rubber (0.6 grams, Taktene 1203 BR, Lanxess). The resulting warm solution blend was stirred until a homogenous mixture formed. Afterward, methanol was slowly poured into this solution blend to precipitate out the polymers. The precipitated polymer blend was dried under vacuum overnight. The polymer blend thus formed was cryo-faced using a cryo-microtome (Leica) at −120° C. for morphology examination by AFM. As shown in the representative AFM micrographs of this blend in FIGS. 7A and 7B, Vistamaxx 6200 domains (black) are surrounded by aPP-XL-NBR-amine (purple) and range from 0.05 micron to 1 micron in the matrix of BR and SBR.

Figure 8A:
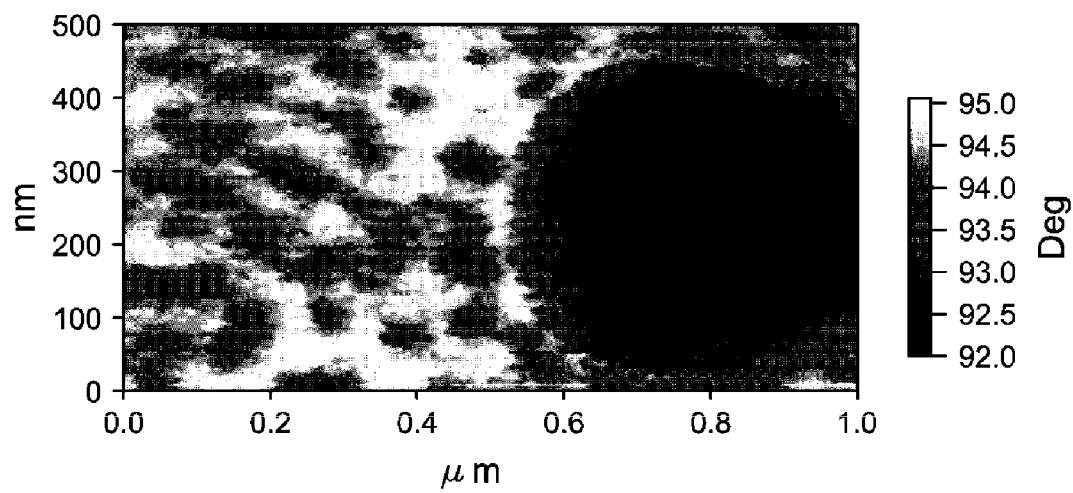
FIGS. 8A and 8B are AFM images of aPP-XL-NBR-amine/Vistamaxx domains in a BR/SBR blend.
Figure 8B:
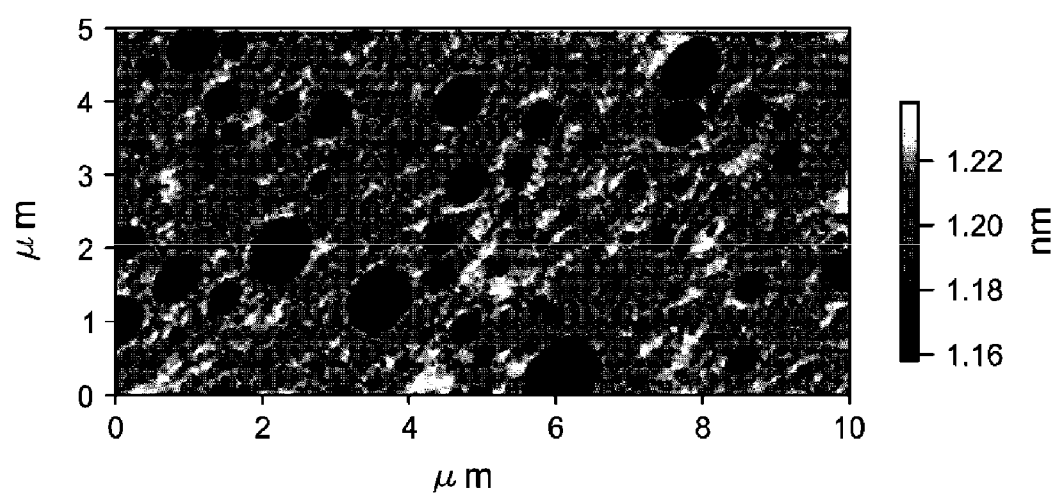

Next, a glass bottle was charged with aPP-XL-NBR-amine (26375-58, 0.04 grams) and Vistamaxx 6200 (0.36 grams). Toluene was added and the mixture was vigorously stirred in a 70° C. oil bath until a homogeneous solution formed. Styrene-butadiene rubber (1.4 grams, VSL 5025 SBR, Lanxess) was then added followed by the addition of butadiene rubber (0.6 grams, Taktene 1203 BR. Lanxess). The resulting warm solution blend was stirred until a homogenous mixture formed. Afterward, methanol was slowly poured into this solution blend to precipitate out the polymers. The precipitated polymer blend was dried under vacuum overnight. The polymer blend thus formed was cryo-faced using a cryo-microtome (Leica) at −120° C. for morphology examination by AFM. As shown in the representative AFM micrographs of this blend in FIGS. 8A and 8B, Vistamaxx 6200 domains (black) are surrounded by aPP-XL-NBR-amine (purple) and range from 0.05 micron to 1 micron in the matrix of BR and SBR.

Synthesis of EP-XL-Poly(Butadiene-Co-Acrylonitrile)-Amine (EP-XL-NBR-Amine)

A round-bottomed flask was charged with vinyl/vinylidene-terminated ethylene polypropylene copolymer (EP, 83% vinyl and 17% vinylidene-terminated, Mn 7274, 7.0 grams, 0.962 millimole), (3-glycidoxylpropyl)-1,1,3,3-tetramethyldisiloxane (2.0 grams, 8.05 millimoles), platinum (0)-1,3-divinyl-1,1,3,3-tetramethyldisiloxane complex solution (approximately 2 wt % Pt, 0.05 grams, 0.005 millimoles) and toluene (50 milliliters). The mixture was heated under nitrogen to 80° C. with stirring overnight, then slowly added to approximately 300 milliliters cold methanol with vigorous stirring. The liquid was decanted and the solid was collected and dried in vacuum. $^1$H NMR showed that while all vinyl end group was gone, the vinylidene end group was still unreacted. The product was then re-dissolved in 50 milliliters toluene and the mixture was heated under nitrogen to 80° C. with stirring. A toluene solution of m-chloroperoxybenzoic acid (1.0 grams, 4.06 millimoles) was then added dropwise to the flask. After the addition was complete, the reaction mixture was maintained at 80° C. overnight. Afterward, the reaction mixture was slowly poured into large quantities of methanol with vigorous stirring. The liquid phase was decanted. The solid was dried under vacuum for overnight. $^1$H NMR of the product showed that all vinyl and vinylidene end groups were gone, indicating the completion of epoxidation.

The above product was mixed with amine-terminated poly(butadiene-co-acrylonitrile) (Emerald 1300X45ATBN, 14 grams, amine equivalent weight 1850), magnesium bromide etherate (0.025 grams, 0.0968 millimoles) and chlorobenzene (100 milliliters). The reaction mixture was heated to 110° C. under nitrogen overnight. The solvent was removed under vacuum, and the final product was washed with methanol and dried under vacuum overnight.

A glass bottle was charged with EP-XL-NBR-amine ("scheme 5" above, 1.5 grams) and Vistamaxx 6200 (3.5 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight and used as the additive.

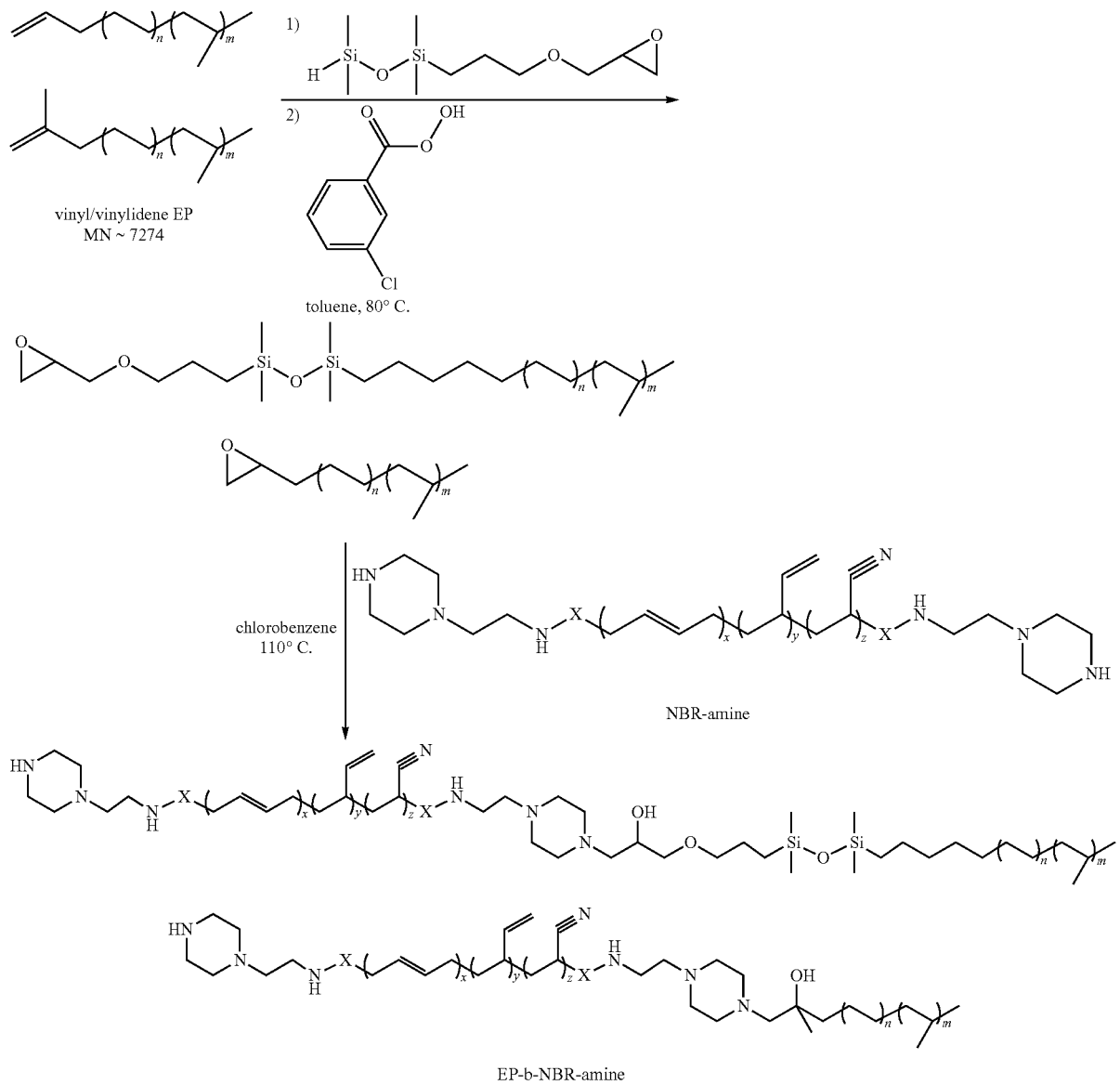

Scheme 5: Reaction between vinyl/vinylidene terminated EP and poly(butadiene-co-acrylonitrile)-amine.

Solution Blending of EP-XL-NBR-Amine (26375-71) with Vistamaxx

A glass bottle was charged with EP-XL-NBR-amine ("scheme 5" above, 0.5 grams) and Vistamaxx 6200 (4.5 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight and used as the compound additive.

A glass bottle was charged with EP-XL-NBR-amine ("scheme 5" above, 2.5 grams) and Vistamaxx 6200 (2.5 grams). Toluene was added and the mixture was vigorously stirred in a 70° C. oil bath until a homogeneous solution formed. Afterward, methanol was slowly poured into this solution blend to precipitate out the polymers. The precipitated polymer blend was dried under vacuum overnight and used as the additive.

Silica Tread Compounding

Tread compound formulations are listed in Table 3. All components are listed in phr, or part per hundred, of polymer unit. These compounds were mixed in two passes using a Banbury mixer which was warmed up to 120° C. for the first pass before any addition. The first pass mixed all components except curative at 25 RPM with polymers added at 0 minute, ½ of silica at 30 seconds, rest of silica and all others except aPP-XL-PB-amine at 1 minute, aPP-XL-PB-amine at 6 minutes with RPM ramped up to 152, and remove compounds at 7 minutes and 30 seconds with 151-153° C. compound temperature. After compounds were cooled, the same Banbury mixer was used to blend in the curatives during the second pass at 35 RPM and 70° C. The compound from the first pass was added into the mixer at 0 minute with curatives added at 30 seconds followed by mixing for an another 6 minutes and 30 seconds with a total mix time of 7 minutes.

TABLE 3

Tread compound formulations.

| Ingredient (phr) | Control | Inventive |
|---|---|---|
| VSL 5025 (SBR 25% styrene, 50% vinyl) | 60 | 60 |
| Silica (Z1165) | 70 | 70 |
| PB (Taktene 1203), high cis-PB | 40 | 40 |
| X50S (Si-69/N330 50/50) | 11.2 | 11.2 |
| Nytex 4700, (Naphthenic oil) | 15 | 15 |
| 6PPD,N-(1,3-Dimethylbutyl)-N'-phenyl-1,4-phenylenediamine | 2 | 2 |
| Inventive compatibilizer | — | 12 |
| Stearic acid | 2.5 | 2.5 |
| TOTAL PHR | 200.7 | 212.7 |
| Curative | | |
| Zinc Oxide | 2.5 | 2.5 |
| Vulkacit CBS-N-Cyclohexyl-2-benzothiazolesulfenamide | 1.7 | 1.7 |
| Sulfur | 1.4 | 1.4 |
| Perkacit DPG-N,N'-Diphenylguanidine | 2 | 2 |

All compounds were compression molded and cured into pads. Afterward, a rectangular test specimen was cut off from the cured pads and mounted in an ARES (Advanced Rheometric Expansion System, TA instruments) for dynamic mechanical testing in torsion rectangular geometry. A strain sweep at room temperature (20° C.) up to 5.5% strains and at 10 Hz was conducted first, followed by a temperature sweep at 4% strain and 10 Hz from −35° C. to 100° C. at 2° C./min ramp rate. Storage and loss moduli were measured along with the loss tangent values. For better wet traction, it is preferred to have higher loss tangent values at temperatures below 0° C. whereas the loss tangent is preferred to be lower at 60° C. for better rolling resistance. As listed in Table 4, the addition of Vistamaxx dispersion in the presence of diblock copolymer compatibilizer raises the loss tangent values at temperatures below 0° C. without significantly raising the loss tangent value at 60° C.

TABLE 4

Compounding Results

| Parameter/ingredient | control A avg. of two batches | control B avg. of two batches | Example 1 | Example 2 | Example 3 | Example 4 |
|---|---|---|---|---|---|---|
| Additive (phr) | — | 13.8 | 13.8 | 13.8 | 13.8 | 13.8 |
| VM6200 | — | 100% | — | 90 | 70 | 50 |
| EP-BR-AN-amine | — | — | 100% | 10 | 30 | 50 |
| stress strain {ISO37, British Std. dies (type 2)} | | | | | | |
| Modulus @ 300%, psi | 2094 | 1775 | 1516 | 1712 | 1740 | 1577 |
| Ultimate Tensile strength, psi | 2593 | 2288 | 2029 | 2343 | 2211 | 2306 |
| Ultimate Elongation (%) | 360 | 365 | 386 | 395 | 359 | 409 |
| DMTA (Ares - ASTM D5279-01) | | | | | | |
| tan delta 0° C. | 0.326 | 0.334 | 0.366 | 0.345 | 0.359 | 0.366 |
| tan delta 60° C. | 0.169 | 0.174 | 0.181 | 0.177 | 0.183 | 0.175 |

Now, having described the inventive polyolefin-polybutadiene block-copolymer and tire tread formulations including the inventive block copolymer, described herein in numbered paragraphs is:

P1. A polyolefin-polybutadiene block-copolymer that is the reaction product of a functionalized polar polybutadiene (fPB), a vinyl-terminated macromer (VTM), and optional cross-linker compound (XL):

where the vinyl-terminated macromer comprises a polyolefin block (PO) having a weight average molecular weight within the range of from 1000 to 150,000 g/mole;

the functionalized polar polybutadiene (fPB) having a weight average molecular weight within the range of from 500 to 30,000 g/mole; and the optional cross-linker compound (XL) comprises at least two cross-linking moieties wherein at least one moiety reacts with the vinyl group of the VTM and at least one moiety reacts with the fPB.

P2. The polyolefin-polybutadiene block-copolymer compatibilizer of numbered paragraph 1, wherein the VTM comprising the cross-linking moiety (XL-PO) reacts with the fPB to form the polyolefin-polybutadiene block-copolymer, or the fPB comprising the cross-linking moiety (fPB-XL) reacts with the VTM to form the polyolefin-polybutadiene block-copolymer.

P3. The polyolefin-polybutadiene block-copolymer compatibilizer of numbered paragraphs 1 or 2, wherein XL-PO has the general formula selected from the group consisting of:

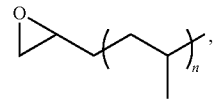

-continued

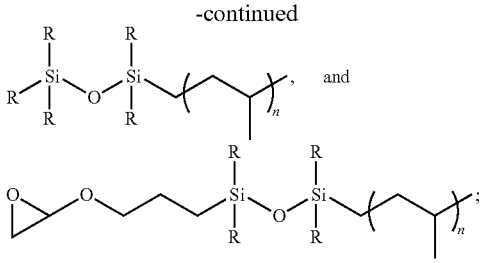

wherein each "R" group is independently selected from $C_1$ to $C_{10}$ alkyls, and wherein the value of "n" is within the range of from 50 to 1000.

P4. The polyolefin-polybutadiene block-copolymer of any one of the previous numbered paragraphs, wherein weight average molecular weight of the polyolefin-polybutadiene block-copolymer is preferably from 1,000 to 150,000 g/mole, more preferably from 2,500 to 125,000 g/mole, and most preferably from 5,000 to 100,000 g/mole.

P5. The polyolefin-polybutadiene block-copolymer of any one of the previous numbered paragraphs, having the general formula:

PO-XL-fPB;

where "PO" is a polyolefin block having a weight average molecular weight within the range of from 1000 to 150,000 g/mole, the "fPB" is a functionalized polar polybutadiene block having a weight average molecular weight within the range of from 500 to 30,000 g/mole, and "XL" is a cross-linking moiety that covalently links the PO and fPB blocks.

P6. The polyolefin-polybutadiene block-copolymer of any one of the previous numbered paragraphs, wherein XL is directly derived from an epoxide, an organosilane, an organosiloxane, or an epoxy-siloxane.

P7. The polyolefin-polybutadiene block-copolymer of any one of the previous numbered paragraphs, further comprising from 5 to 20 wt %, by weight of the composition, of a propylene-α-olefin elastomer.

P8. The polyolefin-polybutadiene block-copolymer of any one of the previous numbered paragraphs, wherein the fPB comprises a polybutadiene primary component and at least one functional group selected from primary, secondary or tertiary amines, acrylonitrile, hydroxide, styrene, isoprene, acrylate, methacrylate, and combinations thereof.

P9. A tire tread formulation comprising the polyolefin-polybutadiene block-copolymer of any one of the previous numbered paragraphs.

P10. The tire tread formulation of numbered paragraph 8, further comprising 15 to 50 or 60 wt % of a styrenic copolymer; 0 or 5 to 20 or 40 wt % of processing oil; and 20 to 60 wt % of filler.

P11. The tire tread formulation of numbered paragraphs 8 or 9, wherein the Modulus at 300% of the cured composition is within the range of from 1000 or 1100 or 1200 or 1300 or 1400 psi to 1800 or 1900 or 2000 or 2100 or 2200 psi.

P12. The tire tread formulation of any one of numbered paragraphs 8-10, wherein the Ultimate Tensile Strength of the cured composition is within the range of from 1600 or 1800 psi to 2400 or 2600 or 2800 or 3000 psi.

P13. The tire tread formulation of any one of numbered paragraphs 8-11, wherein the Ultimate elongation of the cured composition is within the range of from 320 or 340% to 420 or 440 or 460 or 480 or 500%.

P14. The tire tread formulation of any one of numbered paragraphs 8-12, wherein the Tangent Delta (0° C.) of the cured composition is greater than 0.330 or 0.335 or 0.340 or 0.350; or within a range of from 0.320 or 0.340 to 0.360 or 0.380 or 0.400.

P15. The tire tread formulation of any one of numbered paragraphs 8-13, wherein the Tangent Delta (60° C.) of the cured composition is greater than 0.172 or 0.174 or 0.176 or 0.180; or within a range of from 0.170 or 0.174 or 0.176 to 0.180 or 0.186 or 0.190 or 0.200.

P16. The tire tread formulation of any one of numbered paragraphs 8-14, wherein the Maximum Energy Loss (Tangent Delta, wherein the slope is zero) of the immiscible polyolefin domain is a temperature within the range from −30 or −25 or −20 or −10° C. to −5 or 0 or 10° C.

P17. The tire tread formulation of any one of numbered paragraphs 8-15, wherein micelles comprising the polyolefin-polybutadiene block-copolymer in the polymer matrix of the other components have sizes that are preferred to be less than 20 microns, more preferably less than 10 microns, and most preferably less than 5 microns; or within a range of from 0.1 or 0.2 or 0.5 or 1.0 microns to 5 or 10 or 20 microns.

Also disclosed herein is the use of the polyolefin-polybutadiene block-copolymer of any one of numbered paragraphs 1-7 in a tire tread formulation. Also disclosed herein is the use of the polyolefin-polybutadiene block-copolymer of any one of numbered paragraphs 1-8 in a tire tread. Finally, also disclosed is the use of a VTM as described herein in a reaction with a functionalized polar polybutadiene (fPB) as described herein, and optionally a cross-linker compound as described herein, to form a block copolymer.

The invention claimed is:

1. A polyolefin-polybutadiene block-copolymer that is the reaction product of a functionalized polar polybutadiene (fPB), a vinyl-terminated macromer (VTM), and optional cross-linker compound (XL):
    where the vinyl-terminated macromer comprises a polyolefin block (PO) having a weight average molecular weight within the range of from 1000 to 150,000 g/mole;
    the functionalized polar polybutadiene (fPB) having a weight average molecular weight within the range of from 500 to 30,000 g/mole; and
    the optional cross-linker compound (XL) comprises at least two cross-linking moieties wherein at least one moiety reacts with the vinyl group of the VTM (XL-PO) and at least one moiety reacts with the fPB (fPB-XL).

2. The polyolefin-polybutadiene block-copolymer of claim 1, wherein the VTM comprising the cross-linking moiety (XL-PO) reacts with the fPB to form the polyolefin-polybutadiene block-copolymer, or the fPB comprising the cross-linking moiety (fPB-XL) reacts with the VTM to form the polyolefin-polybutadiene block-copolymer.

3. The polyolefin-polybutadiene block-copolymer of claim 1, wherein weight average molecular weight of the polyolefin-polybutadiene block-copolymer is within a range from 1,000 to 150,000 g/mole.

4. The polyolefin-polybutadiene block-copolymer of claim 1, having the general formula:

PO-XL-fPB;

where "PO" is a polyolefin block having a weight average molecular weight within the range of from 1000 to 150,000 g/mole, the "fPB" is a functionalized polar polybutadiene block having a weight average molecular weight within the range of from 500 to 30,000 g/mole, and "XL" is a cross-linking moiety that covalently links the PO and fPB blocks.

5. The polyolefin-polybutadiene block-copolymer of claim 1, wherein XL is directly derived from an epoxide, an organosilane, an organosiloxane, or an epoxy-siloxane.

6. The polyolefin-polybutadiene block-copolymer of claim 1, wherein the fPB comprises a polybutadiene primary component and at least one functional group selected from primary, secondary or tertiary amines, acrylonitrile, hydroxide, styrene, isoprene, acrylate, methacrylate, and combinations thereof.

7. A tire tread formulation comprising the polyolefin-polybutadiene block-copolymer of claim 1.

8. The tire tread formulation of claim 7, further comprising 5 to 20 wt %, by weight of the formulation, of a propylene-α-olefin elastomer.

9. The tire tread formulation of claim 7, further comprising 15 to 60 wt % of a styrenic copolymer; 0 to 40 wt % of processing oil; and 20 to 60 wt % of filler.

10. The tire tread formulation of claim 7, wherein the Modulus at 300% of the cured composition is within the range of from 1000 psi to 2200 psi.

11. The tire tread formulation of claim 7, wherein the Ultimate Tensile Strength of the cured composition is within the range of from 1600 psi to 3000 psi.

12. The tire tread formulation of claim 7, wherein the Ultimate elongation of the cured composition is within the range of from 320% to 500%.

13. The tire tread formulation of claim 7, wherein the Tangent Delta (0° C.) of the cured composition is greater than 0.330.

14. The tire tread formulation of claim 7, wherein the Tangent Delta (60° C.) of the cured composition is greater than 0.172.

15. The tire tread formulation of claim 7, wherein the Maximum Energy Loss (Tangent Delta, wherein the slope is zero) of the immiscible polyolefin domain is a temperature within the range from −30° C. to 10° C.

16. The tire tread formulation of claim 7, wherein micelles comprising the polyolefin-polybutadiene block-copolymer in the polymer matrix of the other components have sizes that are preferred to be less than 20 microns.

* * * * *